UNITED STATES PATENT OFFICE.

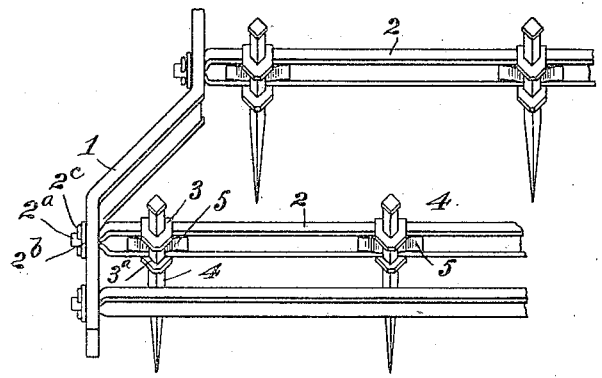
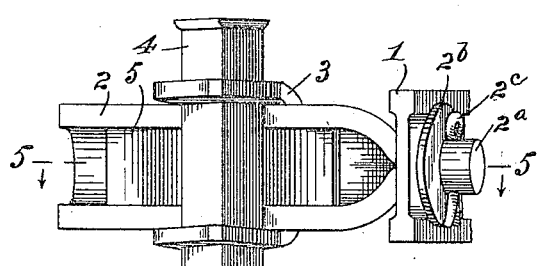
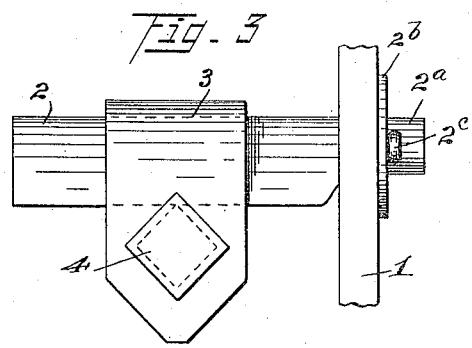
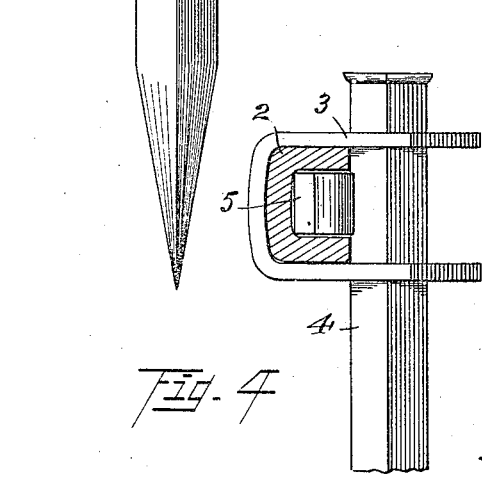
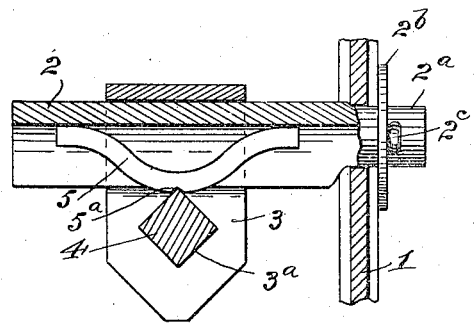
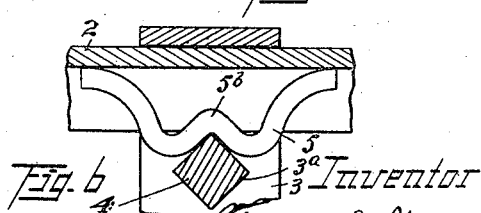

FREDERICK C. WARNE, OF MANSFIELD, OHIO, ASSIGNOR TO RODERICK LEAN MFG. COMPANY, OF MANSFIELD, OHIO, A CORPORATION OF NEW JERSEY.

HARROW.

1,247,043.  Specification of Letters Patent.  Patented Nov. 20, 1917.

Application filed February 14, 1916. Serial No. 78,091.

*To all whom it may concern:*

Be it known that I, FREDERICK C. WARNE, a citizen of the United States, residing at Mansfield, in the county of Richland and State of Ohio, have invented certain new and useful Improvements in Harrows, of which the following is a specification.

My invention relates to improvements in harrows, and more particularly to that class or type known as "spike tooth" harrows.

More specifically stated, my invention relates to improvements in the means for mounting and securing the spike teeth to the tooth carrying bars without the use of threaded bolts or clips, or similar commonly employed tooth fastening devices, the parts of the improved tooth carrying clamp or fastener and the spike tooth being secured in interlocked relation by means of improved spring retainer or resilient key members, the latter being preferably secured in interlocked position by the act of driving the spike teeth into and through the tooth clamp or fastener in the act of mounting the spike tooth upon the tooth carrying bar.

The primary object of the invention is therefore the provision of a generally improved "boltless" tooth fastening or mounting for harrows which is exceedingly simple in construction, cheap of manufacture, and efficient in use, as well as one in which the liability of breakage or disarrangement of parts while in use is reduced to a minimum.

A still further object is the provision of an improved tooth clamp or fastening wherein the tension of an improved spring retainer or resilient key member is employed to prevent the movement of the tooth up or down through the clamp or side-wise upon the tooth bar.

With the above mentioned and other ends in view, the invention consists in the novel construction, arrangement, and combination of parts, hereinafter described, illustrated in some of its embodiments in the accompanying drawings, and particularly pointed out in the appended claims.

Referring to the drawings, forming a part of this specification, Figure 1, is a perspective view of a front corner portion or segment of a harrow section embodying this invention.

Fig. 2, an enlarged detailed perspective view of the secured or intersecting portions of a tooth and tooth carrying bar and clip, together with the improved interlocking spring retainer or key embodying the improved boltless tooth clamp or fastening.

Fig. 3, a top plan view of the same.

Fig. 4, a cross sectional view of one of the tooth carrying bars, the improved tooth clamp or fastening being shown in side elevation.

Fig. 5, a longitudinal sectional view taken on line 5—5 of Fig. 2.

Fig. 6, a similar view showing a slightly modified form of resilient retainer or spring key member.

Similar numerals of reference designate like parts throughout all the figures of the drawings.

The harrow section may follow any suitable or approved form, and, in the present instance, comprises a plurality of tooth carrying bars 2, rotatably mounted in suitable side bars 1, of the harrow section.

As a convenient means of carrying out this invention the tooth carrying bars 2, are preferably formed from channeled or U-shaped bars rounded at their ends to form suitable bearings $2^a$, extending into suitable bearing openings in the side bars 1, the bearings $2^a$, of the channeled or tooth carrying bars 2, being secured, in the present instance, by means of washer members $2^b$, and cotter pins $2^c$.

The tooth carrying bars 2, are provided at suitable intervals with U-shaped clips 3, fitted upon the tooth carrying bars, the open sides of said U-shaped clips projecting in front of the open sides of the U-shaped or channel bars 2, and being provided with tooth receiving openings $3^a$, the latter being adapted to receive and carry the spike teeth 4, so that the corners of such spike teeth will impinge or abut against the open or front sides of the channel or U-shaped bars 2.

As a means of securing or interlocking the intersecting portions of the U-shaped bars and clips 2, and 3, and the spike teeth 4, in proper position so as to prevent lateral movement of the clips 3, and spike teeth 4, on the tooth carrying bars 2, as well as preventing any up or down movement of the teeth 4, through the clips 3, I provide an improved spring retainer or resilient key member 5, said retainer or key member 5, in the present instance, being in the form of a bow spring disposed or seated within the channeled portion of the U-shaped tooth carrying bar and having its outer or free ends resting therein and with its intermediate or median portion resting against and adapted to be compressed by the corner portion of the tooth 4, said median portion of the spring retainer or bow spring normally projecting in advance of the front or open portions of the U-shaped bars so that in the act of assembling or driving the tooth members 4, into and through the tooth receiving openings 3ª, of the clips 3, the spring retainer or resilient key member 5, will be compressed and remain under compression when the parts are assembled thereby securely interlocking the intersecting parts in adjusted position so that the tension of the spring acts to securely interlock the parts and the expansion of such spring retainer or key member will act to take up any movements or loosening of the parts and maintain the parts at all times in proper position.

The bowed or median portion of the spring retainer 5, may be provided with a slight notch 5ª, to receive the adjacent corner of the spike tooth 4, or if desired, the median portion of the bow spring may be bent reversely to form a V-shaped portion 5ᵇ, to receive the adjacent corner of the harrow tooth, as shown in the modified form shown in Fig. 6 of the drawings.

It will also be observed that the bow-shaped key members terminate in outwardly curved and diverging feet seated in the channeled portions of the tooth carrying bars 2, to further coöperate with the latter and said tooth members 4, in securing the latter in position.

From the foregoing description, taken in connection with the accompanying drawings, the operation and advantages of my invention will be readily understood.

Having thus described some of the embodiments of my invention, without having attempted to set forth all the forms in which it may be made, or all the modes of its use, what I claim and desire to secure by Letters Patent, is,—

1. In a harrow, a plurality of intersecting U-bars and clips carrying tooth members on their open sides, and bow-shaped key members interlocking the intersecting portions of said parts, said key members terminating in outwardly diverging curved feet seated in the channeled portions of said U-bars.

2. In a harrow, a tooth carrying bar, a clip carrying a spike tooth on one side of said bar, and a resilient bow-shaped locking member interposed between the latter and said spike tooth, and having diverging feet seated on said bar at opposite sides of said spike tooth and clip.

3. In a harrow, a channeled bar, a clip having tooth receiving openings, a harrow tooth mounted in the latter, and a bow spring tension member terminating in diverging feet extending beyond the sides of said clip and seated in the channeled portion of said bar and having its intermediate portion compressed beneath and interlocking with said harrow tooth whereby all of said parts are interlocked with each other.

4. In a harrow, a U-shaped bar and surrounding open clip, a spike tooth extending across the open sides of said bar and clip, and a resilient bow-shaped key having diverging feet seated in said bar, said resilient bow-shaped key being also provided with an intermediate notched portion at the rear of and compressed by said spike tooth as the latter is driven into said clip.

5. In a harrow, the combination with intersecting U-shaped bars and clips extending in a common direction, and tooth members extending across the open sides of said U-shaped bars and clips; of resilient interlocking bow-shaped members seated in and interposed between the intersecting portions of said bars and clips and tooth members, said bow-shaped members having notched median portions projecting in advance of said open sides of said U-shaped bars and compressed beneath said tooth members and terminating in diverging feet resting in the channeled portions of said U-shaped bars.

In testimony whereof I have affixed my signature in the presence of two witnesses.

FREDERICK C. WARNE.

Witnesses:
C. A. HINES,
M. P. HENRY.

Copies of this patent may be obtained for five cents each, by addressing the "Commissioner of Patents, Washington, D. C."